United States Patent
Kulovesi

(10) Patent No.: US 12,079,854 B2
(45) Date of Patent: Sep. 3, 2024

(54) SYSTEM AND METHOD FOR DETERMINING A SKIN TONE

(71) Applicant: Revieve Oy, Helsinki (FI)

(72) Inventor: Jakke Kulovesi, Helsinki (FI)

(73) Assignee: Revieve Oy, Helsinki (FI)

( * ) Notice: Subject to any disclaimer, the term of this patent is extended or adjusted under 35 U.S.C. 154(b) by 283 days.

(21) Appl. No.: 17/038,538

(22) Filed: Sep. 30, 2020

(65) Prior Publication Data
US 2022/0101405 A1 Mar. 31, 2022

(51) Int. Cl.
| | |
|---|---|
| *G06Q 30/0601* | (2023.01) |
| *A45D 44/00* | (2006.01) |
| *G06T 7/70* | (2017.01) |
| *G06V 40/16* | (2022.01) |
| *G06V 40/19* | (2022.01) |

(52) U.S. Cl.
CPC ....... *G06Q 30/0631* (2013.01); *A45D 44/005* (2013.01); *G06Q 30/0621* (2013.01); *G06T 7/70* (2017.01); *G06V 40/171* (2022.01); *G06V 40/19* (2022.01); *A45D 2044/007* (2013.01); *G06T 2207/30201* (2013.01)

(58) Field of Classification Search
CPC ........... G06Q 30/0631; G06Q 30/0621; A45D 44/005; A45D 2044/007; G06T 7/70; G06T 2207/30201; G06V 40/171; G06V 40/19
See application file for complete search history.

(56) References Cited

U.S. PATENT DOCUMENTS

| | | | |
|---|---|---|---|
| 9,058,765 B1 | 6/2015 | Mallick et al. | |
| 2013/0169827 A1* | 7/2013 | Santos | G06V 40/171 |
| | | | 382/173 |
| 2019/0125249 A1* | 5/2019 | Rattner | A61B 5/0077 |
| 2020/0051298 A1* | 2/2020 | Nguyen | G06T 1/00 |
| 2020/0065609 A1* | 2/2020 | Kim | G06T 5/50 |

OTHER PUBLICATIONS

L. Xu, Y. Du and Y. Zhang, "An automatic framework for example-based virtual makeup," 2013 IEEE International Conference on Image Processing, 2013, pp. 3206-3210, doi: 10.1109/ICIP.2013.6738660. (Year: 2013).*

(Continued)

*Primary Examiner* — Matthew E Zimmerman
*Assistant Examiner* — Latasha D Ramphal
(74) *Attorney, Agent, or Firm* — Ziegler IP Law Group LLC.

(57) ABSTRACT

A system for determining a skin tone of a user. Herein, a server arrangement obtains an input image capturing at least a face of the user; analyze the input image to identify at least one first region of the input image that corresponds to a sclera of the user; determine a representative pixel value of the sclera; determine at least one second region of the input image that corresponds to a skin of the user; normalize pixel values of pixels in the at least one second region; determine a representative pixel value of the skin from the normalized pixel values of the pixels in the at least one second region; and select, from amongst a palette of skin tones, a skin tone whose pixel value matches with the representative pixel value of the skin. Herein, the selected skin tone is determined as the skin tone of the user.

21 Claims, 4 Drawing Sheets

(56) References Cited

OTHER PUBLICATIONS

Choi et al, "The human sclera and pupil as the calibration targets", Electronic Imaging, vol. 2017, No. 17, pp. 200-203, XP055623392, ISSN:2470-1173, DOI: 10.2352/ISSN:2470-1173.2017.17.COIMG-448, Jan. 29, 2017, 4 pages.
Dhall et al, "Adaptive Digital Makeup", Advances in Visual Computing, pp. 728-736, XP019135143, ISBN:978-3-642-10519-7, Nov. 30, 2009, 9 pages.
Do et al, "Skin Color Detection through Estimation and Conversion of Illuminant Color under Various Illumination", IEEE Transaction on Consumer Electronics, vol. 53, No. 3, pp. 1103-1108, XP011193656, ISSN: 0098-3063, DOI: 10.1109/TCE.2007.4341592, Aug. 1, 2007, 6 pages.
European Patent Office, Extended European Search Report, Application No. 21193711.5, Mailed Feb. 22, 2022, 11 pages.
Males et al, "Colour balancing using sclera colour", The Institution of Engineering and Technology, vol. 12, No. 3, pp. 416-421, XP006065644, ISSN: 1751-9659, DOI: 10.1049/IET-IPR.2017.0182, Mar. 1, 2018, 6 pages.

\* cited by examiner

SYSTEM AND METHOD FOR DETERMINING A SKIN TONE

TECHNICAL FIELD

The present disclosure relates to a system and a method for determining a skin tone of a user. The present disclosure also relates to a computer program product for determining the skin tone of the user.

BACKGROUND

Cosmetic products are applied on different areas of the human body, oftentimes to improve the attractiveness of its user. A number of cosmetics products, such as blush, foundation, concealer etc. are presently available in the market. Each cosmetic product comes in a variety of shades to cater to people with different skin tones. Customers need to identify the correct shade matching their skin tone before purchasing the desired cosmetic product. Traditionally, the customers would try multiple shades of the cosmetic product one by one physically at a cosmetic shop to select a suitable shade therefrom. However, a decision of selecting the correct shade of the cosmetic product may still be elusive. Often the customers may rely on the opinions of persons accompanying them or the cosmeticians at the cosmetic shop, which may lead to poor or inconsistent advice that may ultimately confuse the customer. Moreover, the task of visiting the shop and testing various shades of the desired cosmetic product may be a tedious one.

With the changing times, a major section of the population is opting for shopping cosmetic products online. Herein, different type of software applications are used for recommending suitable cosmetic products. Such applications take an image of a face of the customer as an input, and the image is then used to test the desired type of cosmetic product by virtually applying the effect of such cosmetic products on the image. It may be understood that, it is important to have realistic colors in the image taken with a camera of a smartphone or the like, particularly for an app which is used to make recommendations on cosmetic products, because the cosmetic products are used to modify the color of the skin tone of the person. However, the colors in the image taken might not be correct due to various reasons such as lighting conditions, imperfections in an image sensor of the camera, dirt in a camera optics, illumination conditions and the like. For example, in case the customer takes the image in a not so well-lit room, all colors of the image may become dark or grey-colored. Further, the capability of the camera to capture colors in a realistic manner varies and depends on the type and model of the camera. Furthermore, often, when the customer wears a cap, a shadow may be generated that may cover the face at least partially; and hence may result in darker portions in the image. Since, the skin tone of the person is determined from the image, an image with incorrect colors may lead to incorrect determination of the skin tone. Hence, the recommended cosmetic product may also be incorrect.

To overcome issues faced due to non-realistic image, the standardized color palette may be placed next to the customer at the same time as capturing the image. This way standardized colors are visible in the image and the calibration may be done to estimate a correct skin tone of the customer. Alternatively, one can first take the image of the customer and then the image of the standardized color palette from the same, say, smartphone under the same lighting conditions. Said images may be compared to perform the calibration and estimate the correct skin tone of the customer. However, the requirement of a piece of paper for standardized color palette (which may not always be readily handy or even available) makes the task of determining the skin tone of the user, time-consuming and tedious one for the customer, which is undesirable.

Therefore, in light of the foregoing discussion, there exists a need to overcome the aforementioned drawbacks associated with the known techniques for determining a skin tone of a user.

SUMMARY

The present disclosure seeks to provide a system and a method for determining a skin tone of a user. The present disclosure also seeks to provide a computer program product for determining the skin tone of the user. An aim of the present disclosure is to provide a solution that overcomes at least partially the problems encountered in prior art, and provides improved technique for determining the skin tone of the user. The present disclosure seeks to provide a solution to the existing problem of requiring a piece of paper of standardized color palette in order to determine the skin tone of a user.

In an aspect, the present disclosure provides, a system for determining the skin tone of the user, the system comprises a server arrangement communicably coupled via a data communication network to a user device associated with the user, wherein the server arrangement is configured to obtain an input image capturing at least a face of the user; analyze the input image to identify at least one first region of the input image that corresponds to a sclera of the user; determine a representative pixel value of the sclera from pixel values of pixels in the at least one first region of the input image; determine at least one second region of the input image that corresponds to a skin of the user, based on at least one of: an analysis of the input image, an input received from the user device that is indicative of the user's selection of the at least one second region of the input image; normalize pixel values of pixels in the at least one second region or an entirety of the input image, based on a difference between the representative pixel value of the sclera and a reference pixel value; determine a representative pixel value of the skin from the normalized pixel values of the pixels in the at least one second region; and select, from amongst a palette of skin tones, a skin tone whose pixel value matches with the representative pixel value of the skin, wherein the selected skin tone is determined as the skin tone of the user.

In another aspect, the present disclosure provides a method for determining a skin tone of a user, the method comprises obtaining an input image capturing at least a face of the user; analyzing the input image to identify at least one first region of the input image that corresponds to a sclera of the user; determining a representative pixel value of the sclera from pixel values of pixels in the at least one first region of the input image; determining at least one second region of the input image that corresponds to a skin of the user, based on at least one of: an analysis of the input image, an input received from the user device that is indicative of the user's selection of the at least one second region of the input image; normalizing pixel values of pixels in the at least one second region or an entirety of the input image, based on a difference between the representative pixel value of the sclera and a reference pixel value; determining a representative pixel value of the skin from the normalized pixel values of the pixels in the at least one second region; and selecting, from amongst a palette of skin tones, a skin tone whose pixel value matches with the representative pixel value of the skin, wherein the selected skin tone is determined as the skin tone of the user.

In yet another aspect, the present disclosure provides a computer program product for determining a skin tone of a user, the computer program product comprising a non-transitory machine-readable data storage medium having stored thereon program instructions that, when accessed by a processing device, cause the processing device to obtain an input image capturing at least a face of the user; analyze the input image to identify at least one first region of the input image that corresponds to a sclera of the user; determine a representative pixel value of the sclera from pixel values of pixels in the at least one first region of the input image; determine at least one second region of the input image that corresponds to a skin of the user, based on at least one of: an analysis of the input image, an input indicative of the user's selection of the at least one second region of the input image; normalize pixel values of pixels in the at least one second region or an entirety of the input image, based on a difference between the representative pixel value of the sclera and a reference pixel value; determine a representative pixel value of the skin from the normalized pixel values of the pixels in the at least one second region; and select, from amongst a palette of skin tones, a skin tone whose pixel value matches with the representative pixel value of the skin, wherein the selected skin tone is determined as the skin tone of the user.

Embodiments of the present disclosure substantially eliminate or at least partially address the aforementioned problems in the prior art, and enable determination of correct skin tone of the user by compensating for various varying conditions while taking the image of the user and without requiring the piece of paper of standardized color palette.

Additional aspects, advantages, features and objects of the present disclosure would be made apparent from the drawings and the detailed description of the illustrative implementations construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION OF EMBODIMENTS

Figure 1:
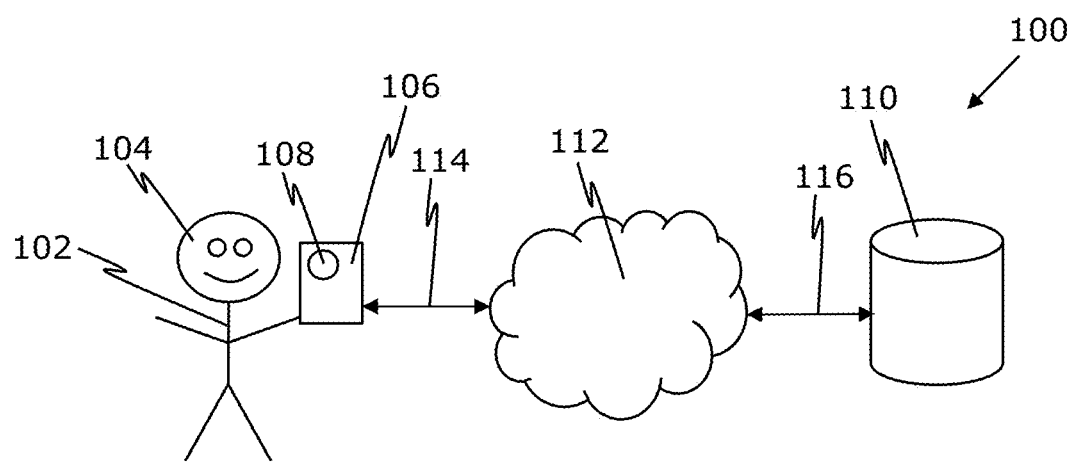
FIG. 1 is a schematic illustration of a system for determining a skin tone of a user, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In an aspect, the present disclosure provides, a system for determining a skin tone of a user, the system comprises a server arrangement communicably coupled via a data communication network to a user device associated with the user, wherein the server arrangement is configured to obtain an input image capturing at least a face of the user; analyze the input image to identify at least one first region of the input image that corresponds to a sclera of the user; determine a representative pixel value of the sclera from pixel values of pixels in the at least one first region of the input image; determine at least one second region of the input image that corresponds to a skin of the user, based on at least one of: an analysis of the input image, an input received from the user device that is indicative of the user's selection of the at least one second region of the input image; normalize pixel values of pixels in the at least one second region or an entirety of the input image, based on a difference between the representative pixel value of the sclera and a reference pixel value; determine a representative pixel value of the skin from the normalized pixel values of the pixels in the at least one second region; and select, from amongst a palette of skin tones, a skin tone whose pixel value matches with the representative pixel value of the skin, wherein the selected skin tone is determined as the skin tone of the user.

In another aspect, the present disclosure provides, a method for determining a skin tone of a user, the method comprises obtaining an input image capturing at least a face of the user; analyzing the input image to identify at least one first region of the input image that corresponds to a sclera of the user; determining a representative pixel value of the sclera from pixel values of pixels in the at least one first region of the input image; determining at least one second region of the input image that corresponds to a skin of the user, based on at least one of: an analysis of the input image, an input received from the user device that is indicative of the user's selection of the at least one second region of the input image; normalizing pixel values of pixels in the at least one second region or an entirety of the input image, based on a difference between the representative pixel value of the sclera and a reference pixel value; determining a representative pixel value of the skin from the normalized pixel values of the pixels in the at least one second region; and selecting, from amongst a palette of skin tones, a skin tone whose pixel value matches with the representative pixel value of the skin, wherein the selected skin tone is determined as the skin tone of the user.

In yet another aspect, the present disclosure provides, a computer program product for determining a skin tone of a user, the computer program product comprising a non-transitory machine-readable data storage medium having stored thereon program instructions that, when accessed by a processing device, cause the processing device to obtain an input image capturing at least a face of the user; analyze the input image to identify at least one first region of the input image that corresponds to a sclera of the user; determine a representative pixel value of the sclera from pixel values of pixels in the at least one first region of the input image; determine at least one second region of the input image that corresponds to a skin of the user, based on at least one of: an analysis of the input image, an input indicative of the user's selection of the at least one second region of the input image; normalize pixel values of pixels in the at least one second region or an entirety of the input image, based on a difference between the representative pixel value of the sclera and a reference pixel value; determine a representative pixel value of the skin from the normalized pixel values of the pixels in the at least one second region; and select, from amongst a palette of skin tones, a skin tone whose pixel value matches with the representative pixel value of the skin, wherein the selected skin tone is determined as the skin tone of the user.

Herein, the "skin tone" refers to a color, lightness or darkness of a person's skin surface. Human skin tones vary from person to person. The skin tone depends mainly on three pigments namely, melanin, carotene and hemoglobin. Melanin is present in an epidermis of the user's skin, which is the outer layer of the skin, and helps determine the darkness of the skin tone. Carotene is present in a dermis of the user's skin, that lies just below the epidermis, and comprises bluish-white dense connective tissues, and helps determine the lightness of the skin tone. Hemoglobin is present in red blood cells within capillaries in the dermis and contributes to the overall skin color with a red dominant for oxygenated hemoglobin and bluish red for reduced hemoglobin. It may be noted that the user is the person whose skin tone needs to be determined.

Throughout the present disclosure, the term "server arrangement" is used to refer to a computer or a device or a module comprising programmable and/or non-programmable structures that executes data related operations, programs or services for the user device via the data communication network. Herein, the "user device" is a computing device, usually portable, operated by the user and comprising a camera. Examples of the user device include, but are not limited to, a smartphone, a laptop, a tablet PC, a palmtop, a web pad with a camera and the like. Further, herein, the data communication network provides a pathway between the server arrangement and the user device. Examples of the data communication network are, but not limited to, local area networks (LANs), wide area networks (WANs), internet and telecommunication network. In the present implementation, the user interacts with the user device and communicates with the server arrangement via the data communication network.

The server arrangement is configured to obtain an input image capturing at least a face of the user. As discussed, the user device comprises the camera. The user interacts with the user device via a graphical user interface (GUI) to take an image in order to capture the face of the user by using the camera therein. In an example, the user may capture the face by operating the user device in selfie mode. In another example, the user device may be operated by a different person (in portrait mode) to capture the face of the user. In yet another example, the user or some other person may select an existing image of the user from a storage of the user device, or from cloud storage for instance. Herein, the captured face of the user is referred to as the input image. Typically, the present system is implemented for processing the input image with one user per input image (as a closeup photograph of the face of the user is preferred). For this purpose, the GUI may provide instruction(s) to capture the input image with a single user at a given time. However, the embodiments of the present disclosure may also be applied to the input image with faces of multiple users captured therein. The obtained input image is sent by the user device to the server arrangement via the data communication network.

Herein, the term "sclera" refers to a white portion of an eye of the user, as in the captured face of the user. For identifying the first region of the input image that corresponds to the sclera of the user, in an implementation, the input image face of the user may be analyzed to recognize different facial features in the face of the user, such as eyes, cheeks, nose, chin, forehead, etc. Based on the analysis, the region corresponding to the white portion in the facial feature recognized as eye is considered as the sclera of the user, and is identified as the first region. For such implementation, the server arrangement may utilize image processing techniques such as principal component analysis, geometric modeling, auto-correlation, deformable template, color analysis, and the like. In another implementation, machine learning techniques may be utilized to identify the first region of the input image. For this purpose, the machine learning model is trained with predefined data set including a set of closeup images of the face of multiple users, with the sclera of the eye in such closeup images being beforehand manually inputted as the first region. Such techniques may be contemplated by a person skilled in the art and thus have not been described herein for the brevity of the present disclosure. In an example, the first region may correspond to the entire sclera of the eye in the captured face of the user. In another example, the first region may correspond to a portion of the sclera of the eye in the captured face of the user.

Herein, the term "pixel" represents the smallest unit of an image and is obtained by sampling the image, with each pixel having a pixel value. Herein, the term "pixel value" generally represents an intensity (or color) of the corresponding pixel. For instance, for a greyscale image having the intensity of pixels ranging from 0 to 255, the pixel value of black colored pixels is considered as '0' and the pixel value of white colored pixels is considered as '255'. For colored images, the pixel values of pixels therein represent an amount of RED, GREEN and BLUE component in the corresponding pixel. Similarly, the pixel value for the pixel in the input image may correspond to a luminance of the corresponding pixel without any limitations. It is to be noted that the term "luminance" as used in this context, refers to a certain color space conversion method that takes in the aforementioned RGB values and outputs luminance value (among other possible output). For instance, Lab colorspace may be used to this end but the method could be something else as well without any limitations.

As discussed, the sclera is the white portion of the eye in the captured face of the user. Hence, ideally, the pixels corresponding to the sclera in the input image should have the same pixel value as white color. However, as mentioned, due to various conditions such as lighting, illumination, imperfection in the camera lens, clothing worn by the user, etc., the input image may not have perfectly captured the white color of the sclera. However, it may be understood that whatever may have been the effect of the said conditions on the sclera, the effect on other regions in the input image might also have been same or equivalent. That is, if the sclera appears dark in the input image, the other regions such as chin, forehead, cheeks etc. would also appear, generally, equally dark.

Further, it may be appreciated that the sclera itself may have varying shades of white color, and thus the first region, having a number of pixels, which corresponds to the sclera of the user may have varying pixel values for the different pixels therein. Herein, the "representative pixel value" is an indicator of the overall pixel value of the first region, and may be determined by calculating an average (a mean or a median) of the pixel values of all the pixels in the first region.

Herein, the second region refers to a skin sampling area for which specifically the skin tone is to be determined. In the present disclosure, the second region generally represents facial skin (i.e. area on the face). For example, the second region may represent the cheek or forehead in the face of the user. However, the second region may also represent skin in other areas such as the neck, hands, etc. without departing from the spirit and scope of the present disclosure.

In one implementation, the second region is determined based on an analysis of the input image. For such analysis, the same techniques (i.e., image processing and/or machine learning) may be utilized as discussed in the preceding paragraphs for identification of the first region in the face of the user. As discussed later in more detail, the second region is considered in order to select a suitable cosmetic product to be applied thereon. Thus, the second region may be considered as any facial area which may be of interest depending on the type of cosmetic product. For instance, if the cosmetic product is a foundation cream, in such case the input image is analyzed to identify cheeks and/or forehead areas in the face of the user as the second region; as foundation cream may be better suited for application on such regions.

In another implementation, the second region is determined based on the input received from the user device that is indicative of the user's selection of the at least one second region of the input image. Herein, the user may interact with the user device using the GUI to select the second region of the input image as per his/her choice. For example, when the user wishes to purchase an under-eye cream, the user may select the under-eye area in the captured face as the second region of the input image. It may be contemplated that, in an example, the selection may be made, for example, by providing touch response on display of the user device at desired area in the captured face in the input image, as displayed thereon. In another example, the selection may be made by selecting from a predefined list of facial features, with such a list including, but not limited to, cheeks, forehead, chin, nose, under-eye, etc. Such implementation may be useful when the user wishes to determine a skin tone of and/or test a cosmetic product for a particular region in the captured face in the input image.

Optionally, when determining the at least one second region, the server arrangement is configured to analyze the input image to identify a plurality of regions thereof that correspond to the skin of the user; and select, based on a predefined criterion, at least one of the plurality of regions for sampling the skin of the user, wherein the at least one of the plurality of regions is determined as the at least one second region. Herein, optionally, the at least one of the plurality of regions satisfies the predefined criterion when at least one of a size of the at least one of the plurality of regions is greater than a predefined threshold size, the size of the at least one of the plurality of regions is greater than sizes of remaining of the plurality of regions, pixel values of pixels in the at least one of the plurality of regions have a uniformity with a predefined tolerance, the at least one of the plurality of regions corresponds to a predefined part of the face of the user.

Herein, the skin sampling area is defined such that first the overall face area is considered. From this area, facial features are detected and removed from the sampling area. Such removed features include the eye region, nostrils, lips, and eyebrows (as these areas do not represent skin color). In addition, the forehead area is removed from the potential sampling area because often times, there is hair covering the area which would obstruct the skin. The aforementioned features are removed with ample surrounding margins to make sure only representative skin area remains. Now as the skin area is defined, the next step is to perform statistical selection from within this selected skin area. It has been determined empirically that when ordered based on their luminance property (for which all pixels from the skin area are converted into Lab Colorspace, wherein L-channel equals luminance), approximately the 42th percentile of the skin area best represents what is considered the skin color. Instead of picking just the exact 42th percentile value for color sampling, all pixels with luminance values between 40 and 50 percentile are selected for final sampling to make the processing more robust against image noise. It may be appreciated that the used empirically determined values may be adjusted based on additional empirical research. In the present implementation, the mean norm over the pixels of the selected skin area is used as the skin tone color.

For this purpose, the server arrangement may divide the input image into multiple areas (or grids), of regular or irregular sizes. The server arrangement may then discern areas which corresponds to facial features in the captured face in the input image. Such discerned areas could be, for example, but not limited to, cheeks, eyes, forehead, nose, lips, etc. In order to do so, the server arrangement may utilize the same techniques (i.e., image processing and/or machine learning) as discussed in the preceding paragraphs for identification of the first region in the face of the user. Further, from such discerned areas, the server arrangement may identify those areas which embody the skin as the regions that correspond to the skin of the user. For instance, in given examples, cheeks and forehead may be identified as regions that correspond to the skin of the user, but not eyes. Subsequently based on the predefined criterion, one or more such regions are selected for sampling the skin of the user, with such selected regions being the second regions. In an example, when the user is shopping for under-eye cream, the server arrangement may identify the under-eye portion in the captured face of the user as the second region. Herein, the predefined criterion may be a suitable region of the skin on which the under-eye cream could be applied.

In an embodiment, the at least one of the plurality of regions satisfies the predefined criterion when the size of the at least one of the plurality of regions is greater than the predefined threshold size. Herein, the predefined threshold size is a minimum possible size value for the region to be determined as the second region. That is, the region to be determined as the second region has to be greater than the predefined threshold size. For instance, when the forehead in the captured face of the user needs to be determined as the second region, the predefined threshold size may be the minimum possible size value for the forehead (as could be generally determined from a sample of available images of various persons). It may be understood that other of the identified plurality of regions which would be smaller than the predefined threshold size, such as chin, nose, etc. would not be selected as the second region in such case.

In an embodiment, the at least one of the plurality of regions satisfies the predefined criterion when the size of the at least one of the plurality of regions is greater than sizes of remaining of the plurality of regions. Herein, the region with the largest size amongst the identified plurality of regions would be determined as the second region. For instance, again, when the forehead in the captured face of the user needs to be determined as the second region, as typically the size of the forehead is greater than the size of other possible identified plurality of regions, such as chin, under-eye, nose, etc.; thus it would be possible to select the forehead in the captured face in the input image with such criterion.

In an embodiment, the at least one of the plurality of regions satisfies the predefined criterion when the pixel values of pixels in the at least one of the plurality of regions have the uniformity with the predefined tolerance. As known, "tolerance" is the maximum permissible variation allowed in a physical quantity, and may be used to calculate an acceptable range of the physical quantity. It may be appreciated that the skin tone in the face of the user varies in the plurality of regions thereof, and thus each of the plurality of regions in the face of the user may have different uniformity of pixel values of pixels therein, and thus different corresponding tolerances. For example, a region representing cheeks may generally be lighter and smoother (uniform) as compared to a region representing under-eye; and accordingly, the pixel values of the pixels in the region representing cheek may have different tolerance for uniformity (generally, higher) than the region representing under-eye (generally, lower), in the face of the user. Hence, if the region representing cheeks is to be identified and determined as the second region, the pixel values of the pixels in the region representing cheeks may be compared with corresponding predefined tolerance to check if it matches.

In an embodiment, the at least one of the plurality of regions satisfies the predefined criterion when the at least one of the plurality of regions corresponds to the predefined part of the face of the user. Herein, the predefined part of the face of the user would be the region of the face of the user for which the skin tone needs to be determined. For example, if the user wishes to find the skin tone of the region representing cheeks (for example, to purchase a foundation cream or the like therefor), the predefined part of the face of the user would be the region representing cheeks. It may be contemplated that for such purpose, same techniques (i.e., image processing and/or machine learning) may be utilized as discussed in the preceding paragraphs for identification of the first region in the face of the user, to identify the predefined part in the first place.

As mentioned, in the embodiments of the present disclosure, the color normalization is performed based on color of the sclera (in the eye) of the user. Herein, the term "color normalization" as used herein is also sometimes referred to as "color correction" in the art. To do so, first the sclera (white area in the eye) is identified from the input image, as discussed in the preceding paragraphs. Herein, the said sclera is assumed to be white colored area, and average RGB (or illuminance luminance) values of the said area are deemed to be reference color for white, and this reference color is used to normalize all the colors in the input image. Herein, biased RGB values are taken for the colors in the input image and corrected color values are outputted. As may be contemplated by a person skilled in the art, color bias is represented with two real numbers $[c\_1, c\_2]$, where:

$c\_1$=mean(R)/mean(G) of the sampled reference white area (sclera in this case), and $c\_2$=mean(B)/mean(G).

Interpretation here is that if, for example, $c\_1>1$, it means that the image has too much red color vs. green color (white areas look red etc.). Therefore, to obtain the correct colors, the red values have to be divided by $c\_1$, reducing the red values in this case. So, correction in total happens so that:

R_correct=R_biased/c_1;

G_correct=G_biased; and

B_correct=B_biased/c_2, for all pixel color values.

That is, the white color of the sclera is used as a base reference and all the other colors in the second region or the entirety of the input image are normalized in reference to the white color of the sclera. In particular, the representative pixel value of the sclera (as discussed earlier in the description) is used as the base reference, and pixel values (which would be "reference pixel values" in this case) of pixels in the second region or the entirety of the input image are normalized based on the representative pixel value of the sclera. Specifically, the pixel values of pixels in the at least one second region or an entirety of the input image are normalized based on the difference between the representative pixel value of the sclera and the reference pixel value for the pixel to be normalized, for instance using the exemplary equation as provided in the preceding paragraph. This way normalized pixel values of the pixels in the at least one second region are determined.

It may be appreciated that the color can be defined in various different ways. In present implementations, the color has been defined in terms of RGB convention with integer 8-bit sampling meaning that values range from 0-255 and the color is a 3 elements long vector. In some implementations, floating point representation may be used to avoid excessive losses in rounding. Since the brightness of the image varies naturally, the ranges of the values themselves are almost anything (within reason). More important is the amount of color which can be estimated in RGB as the relative difference between the color vector values (e.g. red value divided by the green value). The sclera is assumed to be neutral gray (white), which means that the relative proportions between RGB values are (close to) 1. The idealized case is that the proportions are exactly one and that can be used as the reference. For example, RGB [178,178, 178] describes an exactly neutral gray (white) color. However, depending on how the image is illuminated, the sclera area can be darker or brighter; e.g. [89,89,89] or [210,210, 210]. In practice, the images color balance is not perfectly estimated by the imaging device (camera, etc.) and then the proportions R/G or B/G are something differing from value '1.0'. This relative difference is the estimated color bias. From the sampled sclera area, mean of the values R, G, B are taken as the point estimates, i.e. the reference pixel value as referred above.

As discussed in terms of varying shades of white color in the sclera, it may be appreciated that the skin color (skin tone) for a particular second region may also have varying shades in a similar manner. Therefore, the normalized pixel values of various pixels in the at least one second region may also vary (generally within a limited range). Thus, the representative pixel value of the skin from the normalized pixel values of the pixels in the at least one second region is determined. Herein, the "representative pixel value of the skin" is an indicator of the overall pixel value of the second region, and may be determined by calculating an average (a mean or a median) of the normalized pixel values of all the pixels in the second region.

As discussed, the skin tone varies from person to person. Herein, the "palette of skin tones" is a reference scale with a plurality of skin tones known for human skin, ranging from, for example, dark to fair. By comparing the determined representative pixel value of the skin with different skin tones in the palette of skin tones, the skin tone whose pixel value matches with the representative pixel value of the skin is selected. The selected skin tone is determined as the skin tone of the user. Herein, the match could be an exact match or a most similar match (found, for example, using a similarity threshold). It may be understood that the palette of skin tone may provide tens to hundreds of different skin tones. For the purposes of the present disclosure, the palette of skin tone may be in the form of a look-up table of pixel values of various skin tones in which the representative pixel value of the skin may be searched to determine the skin tone for which the representative pixel value of the skin matches exactly or is closest to the representative pixel.

Optionally, the server arrangement is configured to select a cosmetic product based on the skin tone of the user; and recommend the selected cosmetic product to the user, via the user device. Herein, the term "cosmetic product" may encompass any product that may be applied externally on the skin of the user, such as foundation creams, moisturizer creams, under-eye creams, compacts, lip balms and the like. The cosmetic product is generally applied for beautifying the skin, and a suitable or correct cosmetic product needs to be used in order to achieve the desired effect. The cosmetic product suitable to be used depends, to a large extent, on the skin tone of the user. For instance, when a user having dark skin tone wishes to apply a compact, the compact meant for the dark skin tone must be used, as a compact meant for fair skin tone may give a "cakish" effect when applied on such a user which is undesirable. As with the embodiments of the present disclosure, the skin tone of the user is determined, therefore it is possible to select a suitable cosmetic product. This is achieved using information (and possibly mapping) about the suitability of each cosmetic product for particular skin tone(s), as may be provided by manufacturers (or vendors) of the cosmetic products. Further, the selected cosmetic product is recommended to the user, via the GUI of the user device. Along with the recommendation, the GUI may also provide link to directly purchase the recommended cosmetic product.

Optionally, the server arrangement is configured to generate a normalized image from the normalized pixel values of the pixels in the entirety of the input image; apply an effect of the cosmetic product to at least one region of the normalized image that corresponds to the face of the user in order to generate a first output image; and send the first output image to the user device for presentation to the user. As discussed, the normalization of the pixel values of the pixels may be performed for the pixels in the second region or the entirety of the input image. In the present implementation, the pixel values of the pixels in the entirety of the input image are normalized to generate the normalized image. Next, in order to check the effect of the cosmetic product on the face of the user, any one or more of various known simulation techniques such as Open CV, Spectrum-Based Color Reproduction, etc. may be implemented which are beyond the scope of the present disclosure and thus not discussed herein. The representative pixel value of the skin (as determined from the normalized pixel values of the pixels of the skin) provides a proper reference for implementing such techniques. The image generated after applying the effect of the cosmetic product is referred to as the first output image. The first output image may then be sent to the user device to be presented by the user via the GUI, for instance, to enable the user to check the effect of the cosmetic product on his/her skin and further decide whether to purchase the cosmetic product or not.

Optionally, the server arrangement is configured to inverse normalize a pixel value of a color of the cosmetic product to generate an inverse-normalized cosmetic product based on the difference between the representative pixel value of the sclera and the reference pixel value; apply an effect of the inverse-normalized cosmetic product to at least one region of the input image that corresponds to the face of the user, to generate a second output image; and send the second output image to the user device for presentation to the user. As discussed, the cosmetic product is recommended based on the skin tone of the user which is determined according to the representative pixel value of the skin, which in turn depends on the normalized pixel values of the pixels in the second region. Now, if only the pixel values of pixels in the second region are normalized, the effect of the cosmetic product when applied on the entirety of the input image (where pixel values of the pixels outside of the second region may not have been normalized) may not be true representation of actual application of the cosmetic product on the face of the user. Hence, the server arrangement is configured to first, inverse normalize the pixel value of the color of the cosmetic product by converting the pixel value (known from manufacturer or vendor) of the color of the cosmetic product back to the range of pixel values (in the input image).

Herein, "inverse normalization" (sometimes also referred to as "inverse correction" in the art) is achieved by determining:

$R\_biased = R\_original * c\_1$;
$G\_biased = G\_original$; and
$B\_biased = B\_original * c\_2$, for all pixel color values.

In an example, the input image has red bias so everything look more red than they "actually are". In the example, $c\_1=1.1$. ($c\_2=1.0$ for simplicity). If to add, for example, white powder to the face of the user in the input image, the white powder would have to have the same red color bias to match the environmental condition and not to stand apart. Therefore, in the present implementation, white powder with RGB [200, 200, 200] is virtually applied to the input image. After the "inverse normalization", RGB values will be [220, 200, 200] ("R" being 200*1.1) and this should better simulate how the product (i.e. white powder) "would look" if applied to the face of the user in image conditions for the input image.

It may be appreciated that there are some benefits in performing inverse normalization instead of full image color normalization. For instance, it results in significantly reduced computational cost, since all that is required to be done is to calculate two multiplications per product color code (instead of manipulating the image data in its entirety). Additionally, the input image is not altered unexpectedly which might cause confusion to the experience. Further, there is generally no inconsistency in user-generated data; that is, as user takes a selfie, saves it to their device, and then uses the solution described herein to compare against the looks with products applied virtually, the image is kept generally untouched to perform this sort of comparison.

Therefrom, the inverse-normalized cosmetic product is generated based on the difference between the representative pixel value of the sclera and the reference pixel value. The effect of the generated inverse-normalized cosmetic product may then be applied to the at least one region of the input image to generate the second output image. Such an application of effect may be achieved using the same simulation techniques as mentioned in the preceding paragraph. The generated second output image may then be sent to the user device to be presented by the user via the GUI, for instance, to enable the user to check the effect of the cosmetic product on his/her skin in the illumination conditions in which the input image was taken, and further decide whether to purchase the cosmetic product or not.

In an implementation, the range of pixel values of the input image may be taken as 0 to 255, where 0 indicates black and 255 indicates white. In a first example, the input image for a user having an olive skin tone is taken in optimal illumination conditions. Herein, for example, the pixel value of the sclera in the input image may be 255 and the representative pixel value of the skin may be 100. After normalization, the normalized pixel value of the skin would be 0.4 (as calculated using the equation provided above). The skin tone may be deduced from a palette which may have value for olive skin tone as 0.4, as "olive". In a second example, the input image for the same user having olive skin tone is taken in dark illumination conditions. Herein, for example, the pixel value of the sclera in the input image may be 200 and the representative pixel value of the skin may be 80. After normalization, the normalized pixel value of the skin would again be 0.4 (as calculated using the equation provided above). Again, the skin tone may be deduced from a palette which may have value for olive skin tone as 0.4, as "olive".

In one or more embodiments of the present disclosure, the connection to server arrangement may not be mandatory for determining the skin tone. Herein, the user device may be configured to perform locally all the processing and analysis needed for determination of the skin tone. Furthermore, in one or more embodiments of the present disclosure, determination of the skin tone may be assisted with some pre-known information, such as demographics of the user, race of the user, user input, a previously determined skin tone and the like.

Moreover, the present description also relates to the method for determining the skin tone of the user as described above. The various embodiments and variants disclosed above apply mutatis mutandis to the method for determining the skin tone of the user.

Optionally, the method for determining the skin tone of the user further comprises selecting a cosmetic product based on the skin tone of the user; and recommending the selected cosmetic product to the user, via the user device.

Optionally, the method for determining the skin tone of the user further comprises generating a normalized image from the normalized pixel values of the pixels in the entirety of the input image; applying an effect of the cosmetic product to at least one region of the normalized image that corresponds to the face of the user, to generate a first output image; and sending the first output image to the user device for presentation to the user.

Optionally, the method for determining the skin tone of the user further comprises inverse normalizing a pixel value of a color of the cosmetic product to generate an inverse-normalized cosmetic product, based on the difference between the representative pixel value of the sclera and the reference pixel value; applying an effect of the inverse-normalized cosmetic product to at least one region of the input image that corresponds to the face of the user, to generate a second output image; and sending the second output image to the user device for presentation to the user.

Optionally, the step of determining the at least one second region in the method for determining the skin tone of the user further comprises analyzing the input image to identify a plurality of regions thereof that correspond to the skin of the user; and selecting, based on a predefined criterion, at least one of the plurality of regions for sampling the skin of the user, wherein the at least one of the plurality of regions is determined as the at least one second region.

Optionally, the at least one of the plurality of regions of the method for determining the skin tone of the user satisfies the predefined criterion when at least one of a size of the at least one of the plurality of regions is greater than a predefined threshold size, the size of the at least one of the plurality of regions is greater than sizes of remaining of the plurality of regions, pixel values of pixels in the at least one of the plurality of regions have a uniformity with a predefined tolerance, the at least one of the plurality of regions corresponds to a predefined part of the face of the user.

Moreover, the present description also relates to the computer program product for determining the skin tone of the user as described above. Herein, the computer program product may be implemented in a user device, such as a smartphone. The various embodiments and variants disclosed above apply mutatis mutandis to the computer program product for determining the skin tone of the user.

Optionally, the program instructions of the computer program product cause the processing device to select a cosmetic product based on the skin tone of the user; and recommend the selected cosmetic product to the user.

Optionally, the program instructions of the computer program product cause the processing device to generate a normalized image from the normalized pixel values of the pixels in the entirety of the input image; apply an effect of the cosmetic product to at least one region of the normalized image that corresponds to the face of the user, to generate a first output image; and present the first output image to the user.

Optionally, the program instructions of the computer program product cause the processing device to inverse normalize a pixel value of a color of the cosmetic product to generate an inverse-normalized cosmetic product, based on the difference between the representative pixel value of the sclera and the reference pixel value; apply an effect of the inverse-normalized cosmetic product to at least one region of the input image that corresponds to the face of the user, to generate a second output image; and present the second output image to the user.

Optionally, when determining the at least one second region, the program instructions cause the processing device to analyze the input image to identify a plurality of regions thereof that correspond to the skin of the user; and select, based on a predefined criterion, at least one of the plurality of regions for sampling the skin of the user, wherein the at least one of the plurality of regions is determined as the at least one second region.

Optionally, the at least one of the plurality of regions satisfies the predefined criterion when at least one of a size of the at least one of the plurality of regions is greater than a predefined threshold size, the size of the at least one of the plurality of regions is greater than sizes of remaining of the plurality of regions, pixel values of pixels in the at least one of the plurality of regions have a uniformity with a predefined tolerance, the at least one of the plurality of regions corresponds to a predefined part of the face of the user.

The system, the method and the computer product are advantageous as the skin tone of the user may be determined easily without the need of using a paper-based skin tone palette or the like. Herein, the normalization of the second region or the entirety of the input image helps in eliminating the need of placing the skin palette near the face of the user when the input image is captured. Moreover, the skin tone as determined is realistic in spite of the different illumination and other varying conditions. The determined skin tone may be used for recommending the cosmetic product, and helps the user to check the effect of application of the cosmetic product at the comfort of their homes, without the need of testing by actual application by visiting physical stores.

DETAILED DESCRIPTION OF THE DRAWINGS

Referring to FIG. 1, there is shown a schematic illustration of a system 100 for determining a skin tone of a user 102, in accordance with an embodiment of the present disclosure. In particular, the system 100 is implemented for determining the skin tone of the face 104 of the user 102. Herein, the system 100 comprises a user device 106 associated with the user 102 and having a camera 108. The system 100 also comprises a server arrangement 110. The server arrangement 110 is communicably coupled to the user device 106 via a data communication network 112. A first communication link 114 connects the user device 106 to the data communication network 112. A second communication link 116 connects the server arrangement 110 with the data communication network 112. Herein, the user 102 utilizes the user device 106 to operate the camera 108 to generate an input image capturing the face 104 of the user 102. The server arrangement 110 obtains the input image capturing the face 104 of the user 102 from the user device 106 via the data communication network 112.

Figure 2:
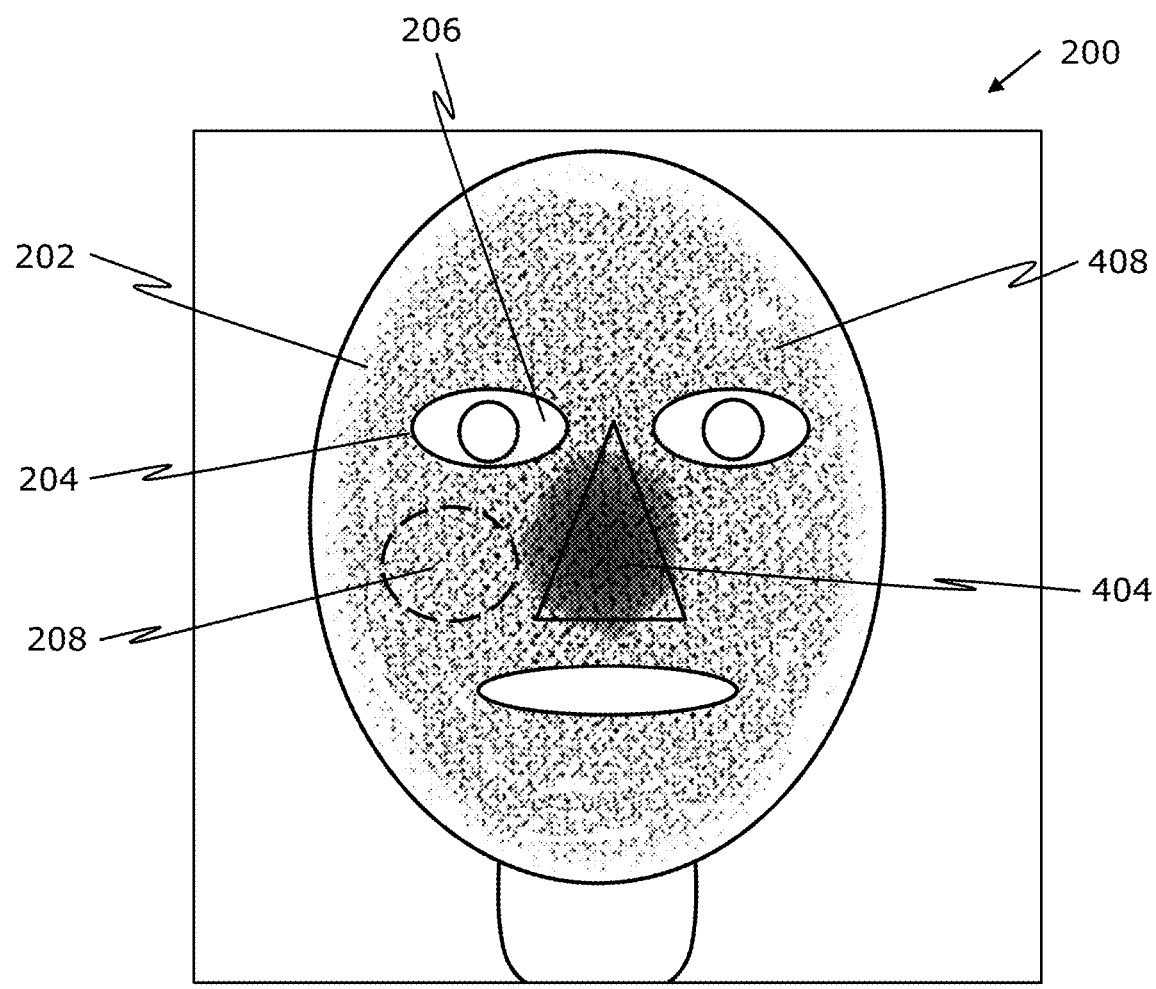
FIG. 2 is a depiction of an input image of a face taken with a camera of a user device, in accordance with an embodiment of the present disclosure.

Referring to FIG. 2, there is shown a depiction of an input image 200 (such as, the input image capturing the face 104 of the user 102 as discussed in reference to FIG. 1), in accordance with an embodiment of the present disclosure. In the exemplary depiction of FIG. 2, the input image 200 of the face 202 includes details about an eye 204 in the face 202, a sclera 206 in the eye 204 in the face 202, and a cheek region 208 in the face 202, wherein the light and dark dotted areas illustrate the skin tones, a medium skin tone 408 and an olive skin tone 404.

Figure 3:
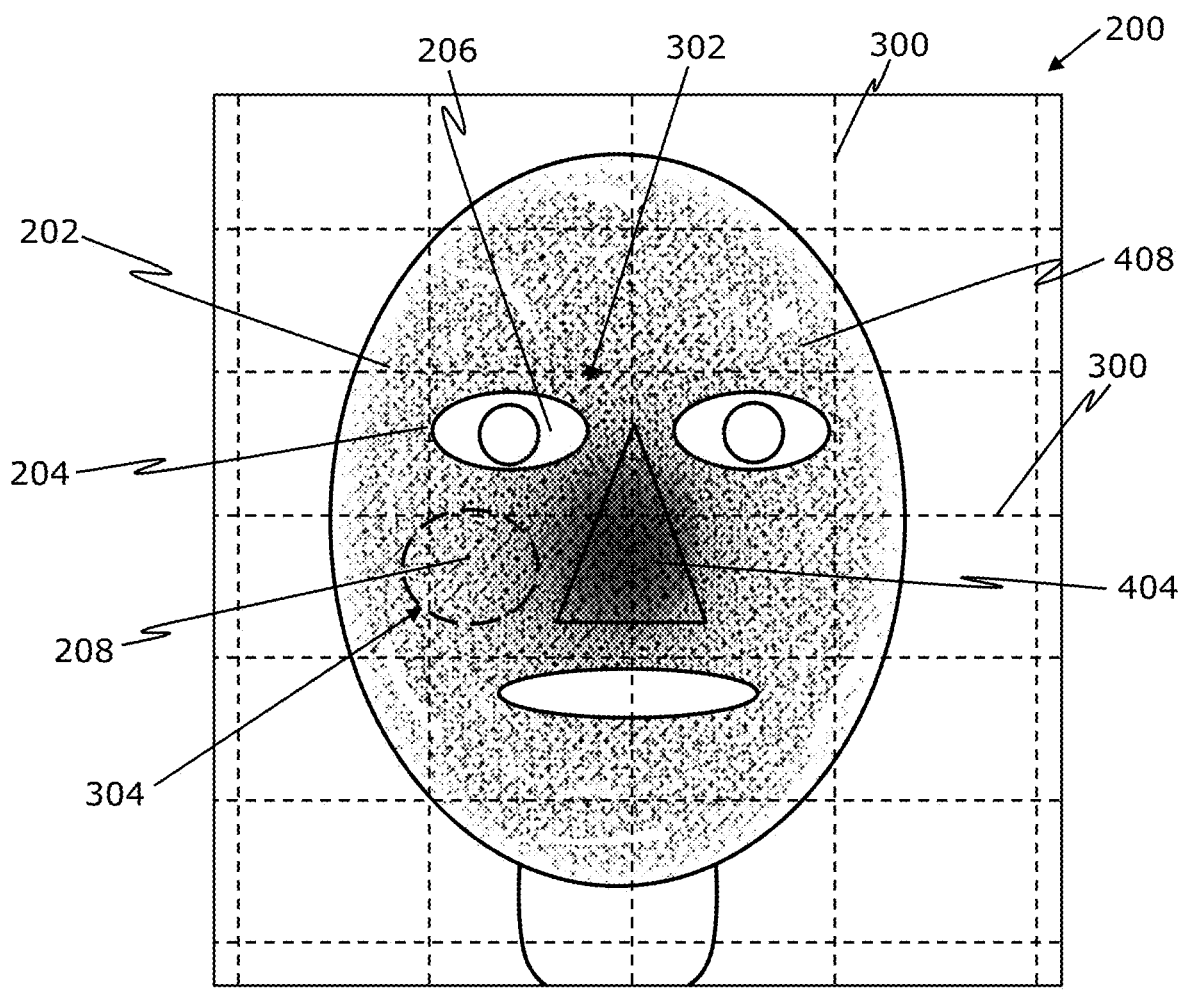
FIG. 3 is a depiction of the input image of the face of FIG. 2 being processed by dividing into a plurality of regions, in accordance with an embodiment of the present disclosure.

Referring to FIG. 3, there is shown a depiction of the input image 200 of the face 202 of FIG. 2 being processed by dividing into a plurality of regions, in accordance with an embodiment of the present disclosure. As shown, the input image 200 is divided into a plurality of regions as shown by the grid lines 300. Herein, as shown, a first region 302 corresponds to the sclera 206 in the eye 204 in the face 202 and a second region 304 corresponds to a skin in the face 202, in particular portion of the cheek 208 in the face 202, wherein the light and dark dotted areas illustrate the skin tones, a medium skin tone 408 and an olive skin tone 404.

Figure 4:
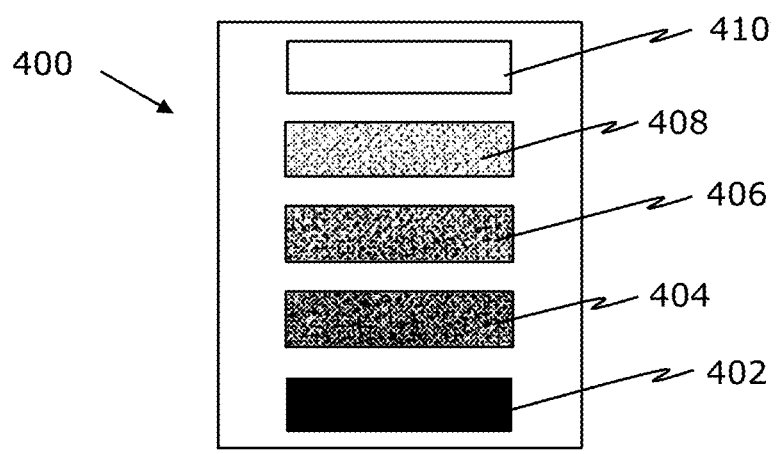
FIG. 4 is an illustration of an exemplary standard palette of skin tones, in accordance with an embodiment of the present disclosure.

Referring to FIG. 4, there is shown an illustration of an exemplary palette of skin tones 400, in accordance with an embodiment of the present disclosure. The exemplary palette of skin tones 400 is shown to include five skin tones, namely dark skin tone 402, an olive skin tone 404, a brown skin tone 406, a medium skin tone 408 and a fair skin tone 410.

Figure 5:
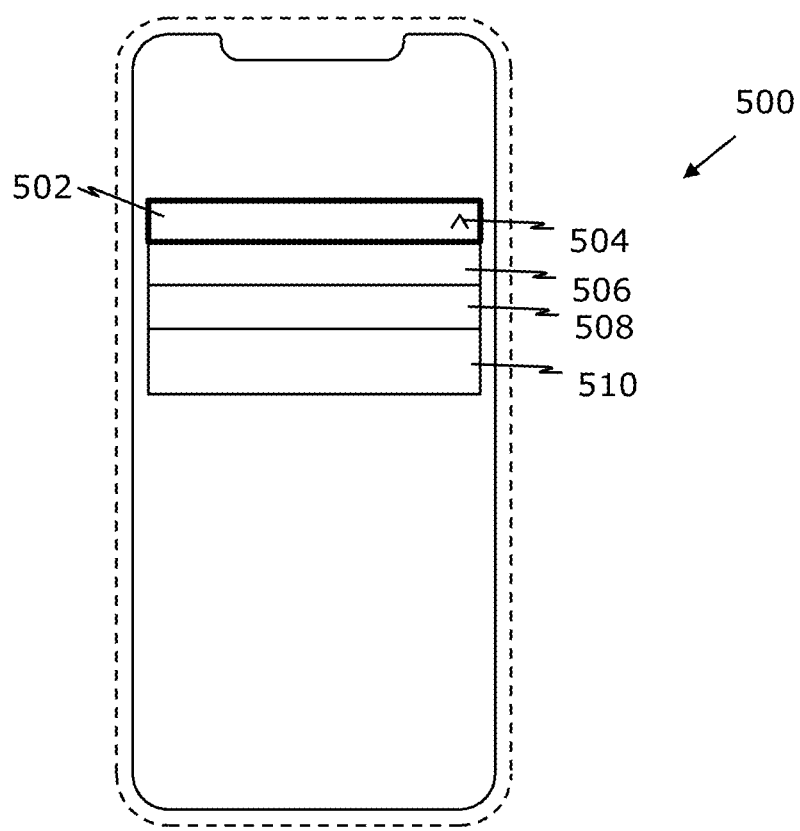
FIG. 5 is an illustration of an exemplary graphical user interface for interacting with the user device, in accordance with an embodiment of the present disclosure.

Referring to FIG. 5, there is shown an illustration of an exemplary graphical user interface (GUI) 500 for interacting with the user device (such as, the user device 106 of FIG. 1), in accordance with an embodiment of the present disclosure. The graphical user interface 500 provides different menus and options, including a select menu 502 with a drop-down arrow 504, a "take a selfie" option 506, a "select the second region" option 508, a display option 510 to display recommendation of cosmetic product. Herein, the select menu 502 is a dropdown menu bar. When clicked on the arrow 504 of the select menu 502, the user is provided with options 506, 508 and 510. The option 506 is selected to capture an input image (such as, the input image 200 of FIG. 2). The option 508 when selected, display the input image to enable receiving of input (by tough response or the like) that is indicative of the user's selection of the at least one second region of the input image. The option 510 when selected presents a first output image (such as, first output image 600 shown in FIG. 6) or a second output image (not shown), as generated by processing the input image, for presentation to the user.

Figure 6:
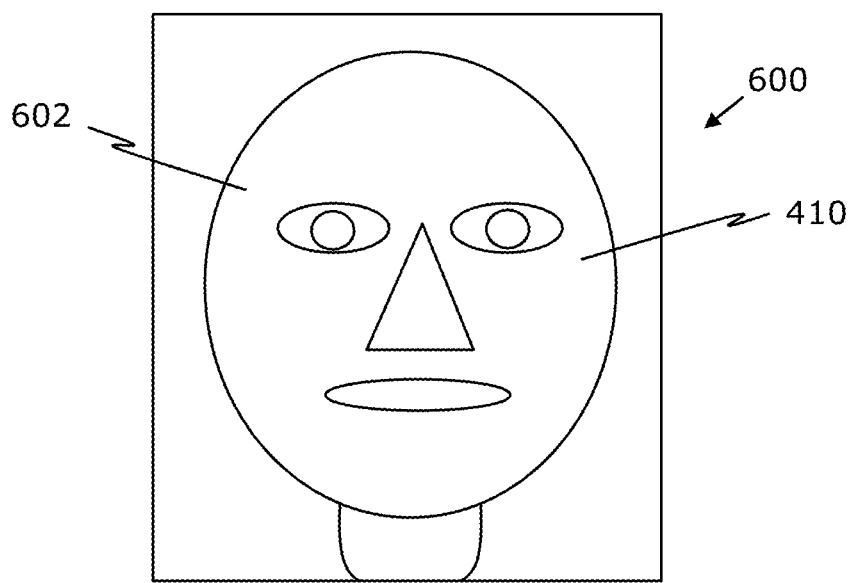
FIG. 6 is a depiction of a first output image, in accordance with an embodiment of the present disclosure.

Referring to FIG. 6, there is shown a depiction of a first output image 600 of a face 602, in accordance with an embodiment of the present disclosure. The first output image 600 is generated by applying an effect of a cosmetic product to at least one region of the input image (specifically, normalized image generated from the input image) that corresponds to the face 602. Herein, the cosmetic product is a compact and has been applied throughout the face 602 and thus the first output image 600 appears to be clearer; that is, after the application of the compact, the skin tone of the face 602 appears to be fair skin tone 410.

Figure 7:
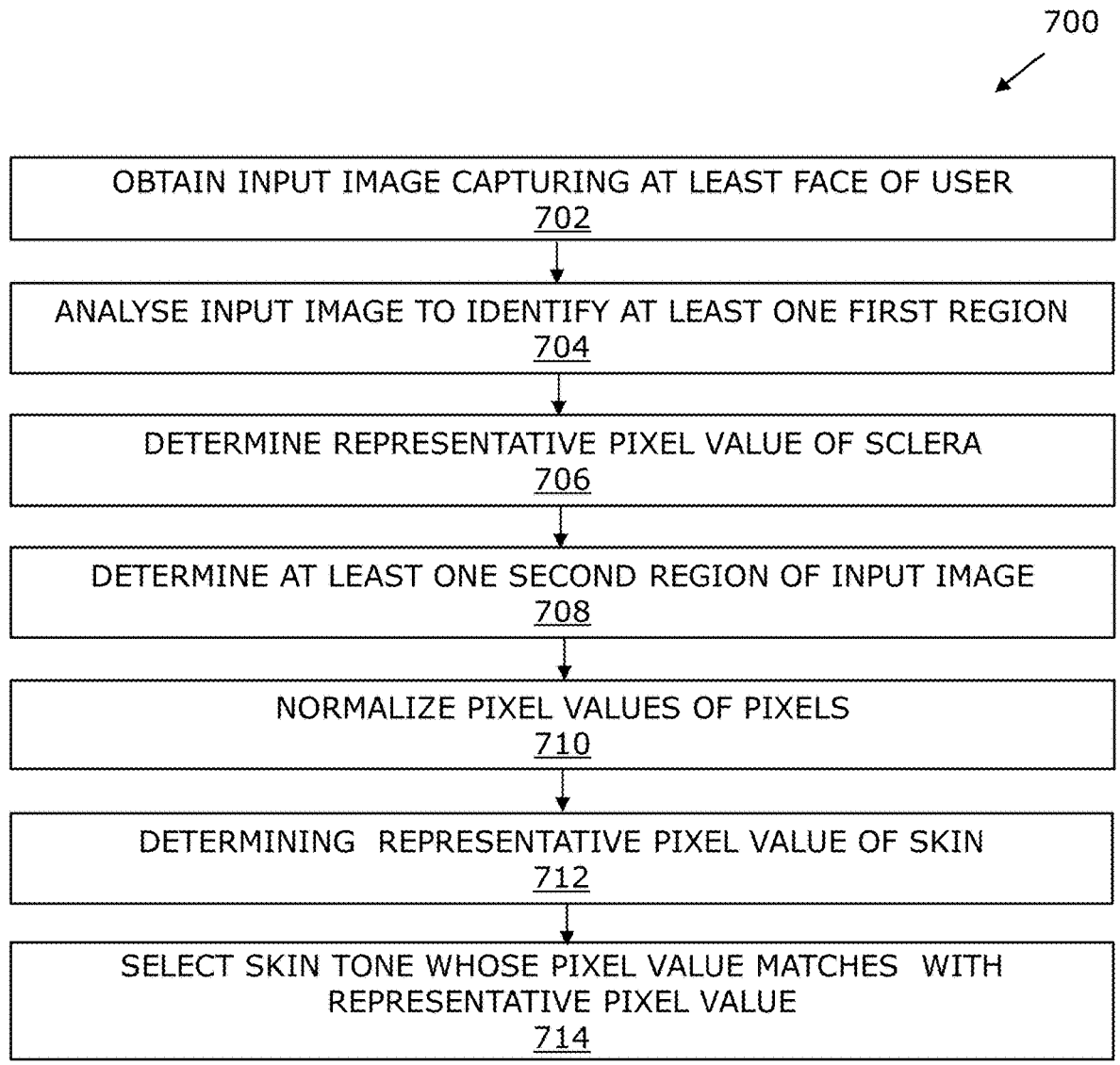
FIG. 7 is an illustration of a flowchart of a method for determining the skin tone of the user, in accordance with an embodiment of the present disclosure.

Referring to FIG. 7, there is shown a flowchart 700 of a method for determining a skin tone of a user, in accordance with an embodiment of the present disclosure. The method comprises, at step 702, obtaining the input image capturing at least face of the user. The method comprises, at step 704, analyzing input image to identify at least one first region. Herein, the identified at least one first region of the input image corresponds to a sclera of the user. The method comprises, at step 706, determining a representative pixel value of sclera. Herein, the representative pixel value of the sclera is determined from pixel values of pixels in the at least one first region of the input image. The method comprises, at step 708, determining at least one second region of input image. Herein, at least one second region of the input image that corresponds to a skin of the user is determined based on at least one of an analysis of the input image and an input received from the user device that is indicative of the user's selection of the at least one second region of the input image. The method comprises, at step 710, normalizing pixel values of pixels. Herein, the pixel values of pixels in the at least one second region or an entirety of the input image are normalized based on a difference between the representative pixel value of the sclera and a reference pixel value. The method comprises, at step 712, determining representative pixel value of skin. Herein, the representative pixel value of the skin is determined from the normalized pixel values of the pixels in the at least one second region. The method comprises, at step 714, selecting skin tone whose pixel value matches with the representative pixel value of the skin. This is achieved by selecting the skin tone from amongst a palette of skin tones and the selected skin tone is determined as the skin tone of the user.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for determining a skin tone of a user, the system comprising a server arrangement communicably coupled via a data communication network to a user device associated with the user, wherein the server arrangement is configured to:
obtain an input image capturing at least a face of the user;
analyze the input image to identify at least one first region of the input image that corresponds to a sclera of the user;
determine a representative pixel value of the sclera from pixel values of pixels in the at least one first region of the input image;
determine at least one second region of the input image that corresponds to a skin of the user, based on at least one of: an analysis of the input image, or an input received from the user device that is indicative of a selection by the user of the at least one second region of the input image;
detect and remove facial features that do not represent skin color from the at least one second region to define a skin sampling area;
normalize pixel values of pixels in the at least one second region or an entirety of the input image, based on a difference between the representative pixel value of the sclera and a reference pixel value to adjust for varied lighting conditions and environmental factors;
determine a representative pixel value of the skin sampling area from the normalized pixel values of the pixels in the at least one second region; and
select, from amongst a palette of skin tones, a skin tone whose pixel value matches with the representative pixel value of the skin sampling area, wherein the selected skin tone is determined as the skin tone of the user, the palette of skin tones being configured for accuracy based on an analysis of skin tones under various lighting conditions;
identifying identify, using machine learning, the first region of the input image utilizing a trained model on a predefined dataset of closeup images with pre-identified sclera regions;
select the at least one second region based on a size of the at least one second region, wherein the size of the at least one second region is greater than a predefined threshold size or is a largest among identified regions,
adjust variations in skin texture and color uniformity by utilizing tolerance levels for pixel value uniformity within selected regions ; and
determine the at least one second region based on the selection by the user via a graphical user interface for a personalized skin tone analysis.

2. The system according to claim 1, wherein the server arrangement is configured to select a cosmetic product based on the skin tone of the user; and recommend the selected cosmetic product to the user, via the user device.

3. The system according to claim 2, wherein the server arrangement is configured to:
generate a normalized image from the normalized pixel values of the pixels in the entirety of the input image;
apply an effect of the cosmetic product to at least one region of the normalized image that corresponds to the face of the user, to generate a first output image; and
send the first output image to the user device for presentation to the user.

4. The system according to claim 3, wherein the server arrangement is configured to:
inverse normalize a pixel value of a color of the cosmetic product to generate an inverse-normalized cosmetic product, based on the difference between the representative pixel value of the sclera and the reference pixel value;
apply an effect of the inverse-normalized cosmetic product to at least one region of the input image that corresponds to the face of the user, to generate a second output image; and
send the second output image to the user device for presentation to the user.

5. The system according to claim 2, wherein the server arrangement is configured to:
inverse normalize a pixel value of a color of the cosmetic product to generate an inverse-normalized cosmetic product, based on the difference between the representative pixel value of the sclera and the reference pixel value;
apply an effect of the inverse-normalized cosmetic product to at least one region of the input image that corresponds to the face of the user, to generate a second output image; and
send the second output image to the user device for presentation to the user.

6. The system according to claim 1, wherein, when determining the at least one second region, the server arrangement is configured to:
analyze the input image to identify a plurality of regions thereof that correspond to the skin of the user; and
select, based on a predefined criterion, at least one of the plurality of regions for sampling the skin of the user, wherein the at least one of the plurality of regions is determined as the at least one second region.

7. The system according to claim 6, wherein the at least one of the plurality of regions satisfies the predefined criterion when at least one of:
a size of the at least one of the plurality of regions is greater than a predefined threshold size;
the size of the at least one of the plurality of regions is greater than sizes of remaining ones of the plurality of regions;
pixel values of pixels in the at least one of the plurality of regions have a uniformity with a predefined tolerance; or
the at least one of the plurality of regions corresponds to a predefined part of the face of the user.

8. A method for determining a skin tone of a user, the method comprising:
obtaining, at a server arrangement, an input image capturing at least a face of the user, transmitted from a user device;
analyzing, by the server arrangement, the input image to identify at least one first region of the input image that corresponds to a sclera of the user;
determining, by the server arrangement, a representative pixel value of the sclera from pixel values of pixels in the at least one first region of the input image;
determining, by the server arrangement, at least one second region of the input image that corresponds to a skin of the user, based on at least one of: an analysis of the input image or an input received from the user device that is indicative of a selection by the user of the at least one second region of the input image;

detecting and removing, by the server arrangement, facial features that do not represent skin color from the at least one second region to define a skin sampling area;

normalizing, by the server arrangement, pixel values of pixels in the at least one second region or an entirety of the input image, based on a difference between the representative pixel value of the sclera and a reference pixel value to adjust for varied lighting conditions and environmental factors;

determining, by the server arrangement, a representative pixel value of the skin sampling area from the normalized pixel values of the pixels in the at least one second region; and selecting, by the server arrangement, from amongst a palette of skin tones, a skin tone whose pixel value matches with the representative pixel value of the skin sampling area, wherein the selected skin tone is determined as the skin tone of the user, the palette of skin tones being configured for accuracy based on an analysis of skin tones under various lighting conditions;

identify, using machine learning, the first region of the input image utilizing a trained model on a predefined dataset of closeup images with pre-identified sclera regions;

select the at least one second region based on a size of the at least one second region, wherein the size of the at least one second region is greater than a predefined threshold size or is a largest among identified regions, adjust variations in skin texture and color uniformity by utilizing tolerance levels for pixel value uniformity within selected regions ; and determine the at least one second region based on the selection by the user via a graphical user interface for a personalized skin tone analysis.

9. The method according to claim 8, further comprising selecting a cosmetic product based on the skin tone of the user; and recommending the selected cosmetic product to the user, via the user device.

10. The method according to claim 9, further comprising:
inverse normalizing a pixel value of a color of the cosmetic product to generate an inverse-normalized cosmetic product, based on the difference between the representative pixel value of the sclera and the reference pixel value;

applying an effect of the inverse-normalized cosmetic product to at least one region of the input image that corresponds to the face of the user, to generate a second output image; and sending the second output image to the user device for presentation to the user.

11. The method according to claim 9, further comprising:
generating a normalized image from the normalized pixel values of the pixels in the entirety of the input image;

applying an effect of the cosmetic product to at least one region of the normalized image that corresponds to the face of the user, to generate a first output image; and sending the first output image to the user device for presentation to the user.

12. The method according to claim 8, further comprising:
inverse normalizing a pixel value of a color of the cosmetic product to generate an inverse-normalized cosmetic product, based on the difference between the representative pixel value of the sclera and the reference pixel value;

applying an effect of the inverse-normalized cosmetic product to at least one region of the input image that corresponds to the face of the user, to generate a second output image; and sending the second output image to the user device for presentation to the user.

13. The method according to claim 8, wherein the step of determining the at least one second region comprises:
analyzing the input image to identify a plurality of regions thereof that correspond to the skin of the user; and selecting, based on a predefined criterion, at least one of the plurality of regions for sampling the skin of the user, wherein the at least one of the plurality of regions is determined as the at least one second region.

14. The method according to claim 13, wherein the at least one of the plurality of regions satisfies the predefined criterion when at least one of:
a size of the at least one of the plurality of regions is greater than a predefined threshold size, the size of the at least one of the plurality of regions is greater than sizes of remaining ones of the plurality of regions, pixel values of pixels in the at least one of the plurality of regions have a uniformity with a predefined tolerance, or the at least one of the plurality of regions corresponds to a predefined part of the face of the user.

15. A computer program product for determining a skin tone of a user, the computer program product comprising a non-transitory machine-readable data storage medium having stored thereon program instructions that, when accessed by a processing device, cause the processing device to:
obtain an input image capturing at least a face of the user;

analyze the input image to identify at least one first region of the input image that corresponds to a sclera of the user;

determine a representative pixel value of the sclera from pixel values of pixels in the at least one first region of the input image;

determine at least one second region of the input image that corresponds to a skin of the user, based on at least one of: an analysis of the input image or an input indicative of a selection by the user' of the at least one second region of the input image;

detect and remove facial features that do not represent skin color from the at least one second region to define a skin sampling area;

normalize pixel values of pixels in the at least one second region or an entirety of the input image, based on a difference between the representative pixel value of the sclera and a reference pixel value to adjust for varied lighting conditions and environmental factors;

determine a representative pixel value of the skin sampling area from the normalized pixel values of the pixels in the at least one second region; and select, from amongst a palette of skin tones, a skin tone whose pixel value matches with the representative pixel value of the skin sampling area, wherein the selected skin tone is determined as the skin tone of the user, the palette of skin tones being configured for accuracy based on an analysis of skin tones under various lighting conditions;

identify, using machine learning, the first region of the input image utilizing a trained model on a predefined dataset of closeup images with pre-identified sclera regions;

select the at least one second region based on a size of the at least one second region, wherein the size of the at least one second region is greater than a predefined threshold size or being a largest among identified regions;

adjust variations in skin texture and color uniformity by utilizing tolerance levels for pixel value uniformity within selected regions ; and determine the at least one second region based on the selection by the user via a graphical user interface for a personalized skin tone analysis.

16. The computer program product according to claim 15, wherein the program instructions cause the processing device to select a cosmetic product based on the skin tone of the user; and recommend the selected cosmetic product to the user.

17. The computer program product according to claim 16, wherein the program instructions cause the processing device to:

generate a normalized image from the normalized pixel values of the pixels in the entirety of the input image;

apply an effect of the cosmetic product to at least one region of the normalized image that corresponds to the face of the user, to generate a first output image; and present the first output image to the user.

18. The computer program product according to claim 17, wherein the program instructions cause the processing device to:

inverse normalize a pixel value of a color of the cosmetic product to generate an inverse-normalized cosmetic product, based on the difference between the representative pixel value of the sclera and the reference pixel value;

apply an effect of the inverse-normalized cosmetic product to at least one region of the input image that corresponds to the face of the user, to generate a second output image; and present the second output image to the user.

19. The computer program product according to claim 16, wherein the program instructions cause the processing device to:

inverse normalize a pixel value of a color of the cosmetic product to generate an inverse-normalized cosmetic product, based on the difference between the representative pixel value of the sclera and the reference pixel value;

apply an effect of the inverse-normalized cosmetic product to at least one region of the input image that corresponds to the face of the user, to generate a second output image; and present the second output image to the user.

20. The computer program product according to claim 15, wherein, when determining the at least one second region, the program instructions cause the processing device to analyze the input image to identify a plurality of regions thereof that correspond to the skin of the user; and select, based on a predefined criterion, at least one of the plurality of regions for sampling the skin of the user, wherein the at least one of the plurality of regions is determined as the at least one second region.

21. The computer program product according to claim 20, wherein the at least one of the plurality of regions satisfies the predefined criterion when at least one of:

a size of the at least one of the plurality of regions is greater than a predefined threshold size, the size of the at least one of the plurality of regions is greater than sizes of remaining ones of the plurality of regions, pixel values of pixels in the at least one of the plurality of regions have a uniformity with a predefined tolerance, or the at least one of the plurality of regions corresponds to a predefined part of the face of the user.

* * * * *